United States Patent Office 3,086,855
Patented Apr. 23, 1963

3,086,855
HERBICIDAL COMPOSITIONS AND METHOD
Enrico Knüsli, Riehen, near Basel, and Kurt Rüfenacht and Hans Gysin, Basel, Switzerland, assignors to J. R. Geigy A.G., Basel, Switzerland
No Drawing. Filed Oct. 23, 1959, Ser. No. 848,227
Claims priority, application Switzerland Nov. 5, 1958
11 Claims. (Cl. 71—2.5)

The present invention is concerned with new compositions for inhibiting plant growth and especially for killing weeds containing triazine derivatives, as well as with the use of these triazine derivatives and of compositions containing them for inhibiting plant growth.

It has been found that s-triazine derivatives of the general formula

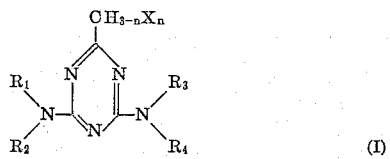

wherein:
X represents a halogen atom,
n represents a number from 2 to 3,
$R_1$ and $R_3$ represent hydrogen or lower alkyl, alkenyl or alkoxyalkyl radicals, and
$R_2$ and $R_4$ represent hydrogen or lower alkyl, alkenyl or alkanoyl radicals, have excellent herbicidal activity.

2-trichloromethyl-4,6-diamino - s - triazine, 2-trichloromethyl-4-amino-6-methylamino - s - triazine, 2-trichloromethyl-4,6-bis-methylamino-s-triazine, 2-dibromomethyl-4,6-diamino-s-triazine, 2-tribromomethyl - 4,6 - diamino-s-triazine and 2-tribromomethyl-4,6-bis-methylamino-s-triazine are known compounds which are embraced by the general Formula I.

There are several possible methods for the production of compounds of the general Formula I which have not been known up to now. The choice of process depends, to some extent on the meaning of the variable radicals and n.

Thus, compounds of the general Formula I can be produced by reacting substituted biguanides of the general formula

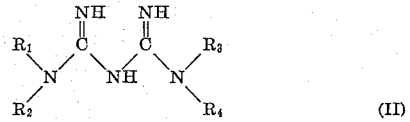

with reactive functional derivatives of halogen acetic acids of the general formula $$CH_{3-n}X_n—CO—OH \qquad (III)$$

wherein $R_1$, $R_2$, $R_3$, $R_4$, X and n have the meanings given above, in particular with lower molecular alkyl esters or nitriles of such acids such as e.g. chloracetic acid methyl ester or ethyl ester, chloracetonitrile, dichloracetic acid ethyl ester, bromacetic acid ethyl ester or trifluoracetic acid ethyl ester. Biguanides suitable for reaction of the general Formula II are, for example, 1,5-diethyl biguanide, 1,5-di-isopropyl biguanide, 1-ethyl-5-isopropyl biguanide and 1,1,5,5-tetra-ethyl biguanide.

Also, 2,4,6-tris-trichloromethyl-s-triazine can be reacted with 2 mols of an amine of the general formula

or they can be reacted with one mol of that amine and with one mol of an amine different therefrom of the general formula

to form 2-trichloromethyl-4,6-diamino-s-triazines, the amino groups of which can be mono- or di-substituted, while splitting off, in all, 2 mols of chloroform.

Examples of amines of the general Formulae IV and V are: ethylamine, n-propylamine, isopropylamine, diethylamine, allylamine and γ-methoxy-propylamine; also ammonia and methylamine can be used as starting materials of the general Formula V.

In addition, in compounds of the general Formula I which contain a 2-halogen methyl group, the halogen atom can be replaced by another atom, e.g. a bromine atom can be replaced by an iodine atom.

Finally, compounds of the general Formula I in which $R_2$ and/or $R_4$ is hydrogen, which compounds are obtained by one of the first two processes mentioned, can be converted into compounds having corresponding lower molecular alkanoyl radicals $R_2$ and/or $R_4$ by treatment with reactive functional derivatives of low molecular alkanoic acids, in particular with anhydrides such as acetanhydride, propionic acid, butyric acid, isobutyric acid anhydrides or formic acid-acetic acid anhydride.

The following examples further illustrate the possibilities for the production of the active ingredients usable according to the invention. Parts are given as parts by weight and their relationship to parts by volume is as that of grammes to cubic centimetres. The temperatures are in degrees centigrade.

EXAMPLE I 433 parts of 2,4,6-tris-trichloromethyl-s-triazine are added while gently cooling at a temperature of 20–40° to 1000 parts of about a 50% solution of ethylamine in water. Soon after the triazine has dissolved, a crystalline substance quickly begins to precipitate. The whole is stirred for 4–5 hours at room temperature, the chloroform formed during the reaction is removed in the vacuum, the crude product is filtered off and is recrystallised from alcohol/water. The 2-trichloromethyl - 4,6 - bis - ethylamino-s-triazine so obtained melts at 128–130°.

2-trichloromethyl-4,6-bis - isopropylamino - s - triazine, M.P. 101–103°, 2-trichloromethyl - 4,6 - bis-allylamino-s-triazine, M.P. 116–117°, and 2-trichloromethyl-4,6-bis-(γ-methoxy-propylamino)-s-triazine, M.P. 94–95°, are obtained in an analogous manner.

EXAMPLE II

A solution of 3 parts of methylamine in 25 parts of anhydrous benzene is added dropwise at 20–35° while gently cooling to a solution of 43 parts of 2,4,6-tris-trichloromethyl-s-triazine in 100 parts of anhydrous benzene.

After 3 hours, the reaction solution is concentrated in the vacuum and the residue is recrystallised from ether/petroleum ether. The 2,4-bis-trichloromethyl-6-methylamino-s-triazine melts at 116–118°.

20 parts of this intermediate product are added at 20–40° to 50 parts of about a 50% solution of ethylamine in water. Shortly after the triazine derivative has dissolved, the reaction product begins to crystallise out. The whole is stirred for 4–5 hours at room temperature, the chloroform formed is removed in the vacuum, the reaction product is filtered off and recrystallised from ethanol/water. The 2-trichloromethyl-4-methylamino-6-ethylamino-s-triazine formed melts at 139–141°.

2-trichloromethyl-4-ethylamino - 6 - isopropylamino-s-triazine which melts at 109–111° is obtained in an analogous manner.

EXAMPLE III 3.5 parts of sodium are dissolved in 110 parts of methanol; 31 parts of 1-ethyl-5-isopropyl biguanide hydrochloride are then added at 0–10° and afterwards 22 parts of trifluoroacetic acid ethyl ester are added dropwise. The whole is stirred for 4–5 hours at room temperature, 150 parts of water are then added, the reaction product is filtered off and recrystallised from methanol/water. The 2 - trifluoromethyl-4-ethylamino-6-isopropylamino-s-triazine obtained melts at 108–109°.

By the same process on using 30 parts of 1,5-bis-ethyl biguanide hydrochloride and 24 parts of dichloracetic acid ethyl ester, 2-dichloromethyl-4,6-bis-ethylamino-s-triazine is obtained. M.P. 129–131°.

The following compounds are also obtained in an analogous manner: 2-trifluoromethyl-4,6-bis-ethylamino-s-triazine, M.P. 164–165°, 2-trifluoromethyl-4-ethylamino-6-diethylamino-s-triazine, M.P. 66–67°, 2-dichloromethyl-4-methylamino-6-ethylamino-s-triazine, M.P. 115–116°, 2-dichloromethyl - 4 - ethylamino-6-isopropylamino-s-triazine, M.P. 84–85°, 2-dichloromethyl-4-ethylamino-6-diethylamino-s-triazine, M.P. 66–68°, and 2-dibromomethyl-4,6-bis-ethylamino-s-triazine, M.P. 105–106°.

EXAMPLE IV 28 parts of 2-trichloromethyl-4,6-bis-ethylamino-s-triazine and 100 parts of acetanhydride are refluxed for 6 hours. The reaction solution is then concentrated in the vacuum until it has the consistency of syrup and it is then stirred with water until crystallisation occurs. The crystals are filtered off, dried and then recrystallised first from ether/petroleum ether and then from methanol/water. The 2 - trichloromethyl-4-(N-acetyl-ethylamino)-6-ethyl-amino-s-triazine so obtained melts at 106–107°.

If the heating with acetanhydride is performed for 24 hours, then an oily product which boils at 142° under 0.001 mm. pressure is obtained. This product consists chiefly of 2 - trichloromethyl - 4,6 - bis-(N-acetyl-ethylamino)-s-triazine.

Active ingredients suitable for weed killers according to the invention are in particular those compounds of the general Formula I in which the radical —$CH_{3-n}X_n$ is the trichloromethyl, or trifluoromethyl radical, $R_1$ is a lower molecular alkyl radical, $R_3$ is a lower molecular alkyl radical having at least 2 carbon atoms, and $R_2$ and $R_4$ are hydrogen.

The compounds named above as well as others of the general Formula I defined above are excellently suitable as active ingredients for weed killers, both for the selective control of weeds among cultivated plants as well as for the total destruction and inhibition of undesired plant growth. By weeds are meant here also undesired cultivated plants, for example, those from a previous crop. The compounds defined above also are suitable as active ingredients for the attainment of other inhibitory influences on plant growth, in particular defoliation, e.g. of cotton plants, desiccation e.g. of potato plants also for blossom thinning, prolongation of the harvesting period and storing propensities.

The weed killers according to the invention can be used in the form of solutions, emulsions, suspensions, pastes, dusts or granules. All forms of application, however, must ensure that the active ingredient is contained in a finely distributable form. In particular, when used for the total destruction of plant growth, early desiccation as well as defoliation, the action can be increased by the use of carriers having a phytotoxic action such as e.g. high boiling mineral oil fractions; on the other hand, the selectivity of the inhibitory action, e.g. in selective weed killing, is generally better attained by using carriers which are inert to plants.

In particular higher boiling organic liquid such as mineral oil fractions, coal tar oils as well as also vegetable and animal oils are used for the production of solutions. In order to more easily dissolve the active ingredients in these liquids, possibly slight amounts of organic liquids having better dissolving powers and generally a lower boiling point can be added, i.e. solvents such as alcohols, e.g. ethanol or isopropanol, ketones, e.g. acetone, butanone or cyclohexanone, diacetone alcohol, cyclic hydrocarbons e.g. benzene, toluene or xylene, chlorinated hydrocarbons e.g. tetrachloroethane or ethylene chloride or mixtures of such substances.

The aqueous forms of application are chiefly emulsions and dispersions. The substances are homogenised in water either as such or in one of the solvents named above, with the aid of surface active emulsifying or dispersing agents. Cation active emulsifying agents are e.g. quaternary ammonium compounds and alkyl polyoxyethylene amines such as Katapol PN–430 of Antara Chemicals. Anion active emulsifying and dispersing agents comprise soaps, soft soaps, salts of alkylaryl sulphonates such as Nekal BX–78 of Antara Chemicals, Ninate 402 of Ninol Laboratories Inc., Sellogen HR of Jacques Wolf & Co., Tinovetin B of J. R. Geigy A.G., salts of fatty alcohol sulphates such as Duponol L 144–WDG of E. I. du Pont de Nemours & Co., salts of sulphonates of vegetable or animal oils, and complex sulphonates such as Emcol H–A, H–B and H–C of Emulsol Chemical Corp. Nonionic emulsifying agents are e.g. polyethylene glycol ethers of alkylphenols and other polyethers such as Triton X–100 of Rohm & Haas Co., Agrimul 70A and 70B of Nopco Chemicals Co., polyethylene glycol esters of fatty acids such as Nonisol 100 and Nonisol 200 of Geigy Chemical Corp. and Emulsan O and Emulsan K of Reilly-Whiteman-Walton Co., polyoxyethylene sorbitan esters of fatty acids used together with corresponding sorbitan esters such as Tween 60 together with Span 60 of Atlas Powder Co. Anionic agents are used in many cases advantageously in combination with nonionic agents or use is made of commercial blends of anionic and nonionic agents such as Toximal 500 of Ninol Laboratories, Agrimul GA of Nopco Chemical Co., Emcol H 400, H 500, H 600, H 700 or H 800 of Emulsol Chemical Corp., HS–31 Emulsifier of Thompson Chemicals Corp. or T–H Emulsifiers of Thompson-Hayward Chemical Co. Liquid or pasty concentrates suitable for dilution with water comprise a herbicidal substance according to the invention, an emulsifying or dispersing agent and, possibly, a solvent as mentioned above.

Dusts and sprinkling agents can be produced by mixing or milling the active ingredient with a solid carrier. Such carriers are: talcum, diatomaceous earth, kaolin, bentonite, calcium carbonate, tricalcium phosphate, sand, or also sawdust ground cork, and other materials of vegetable origin. On the other hand, the carriers can also be impregnated with solutions of the active ingredients in a volatile solvent and evaporating the latter. By the addition of surface active agents, e.g. the emulsifying agents mentioned above, and protective colloids, e.g. sulphite waste liquor, pulverulent preparations and pastes can be made suspendable in water and used as sprays.

The various forms for application can be more closely adapted to the intended use in the usual way by the addition of substances which improve or decrease the distribution and penetration into the ground depending on the depth of roots of the weeds to be destroyed. The biological effect can be widened by the addition of substances having bactericidal or fungicidal properties, for example, for the attainment of a general earth sterilisation or, in selective weed killing, for the protection of cultivated plants from other injurious organisms. Substances which also influence plant growth, such as e.g. 3-amino-1,2,4-triazole to accelerate the onset of action, or, e.g. salts of α,α-dichloropropionic acid to widen the range of herbicidal action, may possibly be desirable. A combination with fertilisers may be labour saving and can favour the action of the herbicide.

The amounts of active ingredient necessary per acre vary in selective weed killing dependent on the sensitivity of the weeds, the resistance of the cultivated plants, the time of application, climatic conditions and the condition of the ground, between about 0.25 and 10 lbs. per acre (2.5–100 g. per 100 sq. metres), whilst for the complete elimination of plant growth generally about 5–20 lbs. per acre (50–200 g. per 100 sq. metres) should be used. In certain cases, however, the above amounts can also be exceeded.

Examples of typical forms of application are given below:

Example 1

10 parts of active ingredient, e.g. 2-trichloromethyl-4,6-bis-ethylamino-s-triazine or 2-trifluoromethyl-4,6-bis-ethylamino-s-triazine and 90 parts of talcum are ground in a ball mill, a pin beater mill or another suitable mill. The mixture obtained serves as a dust.

Example 2

20 parts of active ingredient, e.g. 2-trichloromethyl-4-methylamino-6-isopropylamino-s-triazine, or 2-trifluoromethyl-4,6-bis-ethylamino-s-triazine, are dissolved in a mixture of 48 parts of diacetone alcohol, 16 parts of xylene and 16 parts of an anhydrous polyethylene glycol ester of higher fatty acids. This concentrate can be diluted with water to form emulsions of any concentration desired.

Example 3

50–80 parts of active ingredient, e.g. 2-trichloromethyl-4-ethylamino-6-isopropylamino-s-triazine or 2-trifluoromethyl-4-ethylamino-6 - isopropylamino - s - triazine, are mixed with 2–5 parts of a wetting agent, e.g. a sulphuric acid ester of an alkyl polyethylene glycol ether, 1–5 parts of a protective colloid, e.g. sulphite waste liquor and 14–44 parts of an inert solid carrier such as e.g. kaolin, bentonite, chalk or kieselguhr and the mixture is then finely milled in a suitable mill. The wettable powder obtained can be stirred up with water and produces very stable suspensions.

Example 4

10 parts of active ingredient, e.g. 2-trichloromethyl-4-methylamino-6-isopropylamino-s-triazine or 2-trifluoro-methyl-4,6-bis-ethylamino-s-triazine, are dissolved in 60–80 parts of a high boiling organic liquid such as e.g. coal tar oil, diesel oil or spindle oil to which 30–10 parts of xylene have been added. It can be used as a spray.

Example 5

5–10 parts of active ingredient, e.g. 2-trichloromethyl-4,6 - bis - ethylamino-s-triazine, 2-trifluoromethyl-4-ethyl-amino - 6-isopropylamino-s-triazine or 2-chloromethyl-4-ethylamino - 6-isopropylamino-s-triazine, are mixed and milled with 95–90 parts of calcium carbonate (= ground limestone). The product can be used as a sprinkling agent.

Example 6

95 parts of a granular carrier, e.g. sand or calcium carbonate are moistened with 1–5 parts of water, isopropanol or polyethylene glycol and then 5 parts of active ingredient, for example one of those mentioned in example 5, are mixed in.

A greater amount, e.g. 100–900 parts of a possibly water soluble fertiliser such as e.g. ammonium sulphate or urea, can be mixed with the above mixture or with one containing more active ingredient, e.g. 10 parts of active ingredient and 90 parts of calcium carbonate. The granulates obtained can be sprinkled.

What we claim is:
1. A method of inhibiting the growth of plants which comprises bringing into contact with at least a part of a plant in an amount sufficient to inhibit plant growth, a triazine derivative of the formula

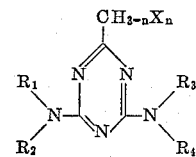

wherein:
X represents a halogen atom,
$n$ represents a number from 2 to 3,
$R_1$ and $R_3$ each represents a member selected from the group consisting of hydrogen, lower alkyl, lower alkenyl and lower alkoxy-alkyl radicals, and
$R_2$ and $R_4$ each represents a member selected from the group consisting of hydrogen, lower alkyl, lower alkenyl and lower alkanoyl radicals.

2. A method of inhibiting the growth of plants which comprises bringing into contact with at least a part of a plant in an amount sufficient to inhibit plant growth, 2-trichloromethyl-4,6-bis-ethylamino-s-triazine.

3. A method of inhibiting the growth of plants which comprises bringing into contact with at least a part of a plant in an amount sufficient to inhibit plant growth, 2-trichloromethyl-4-ethylamino-6-isopropylamino-s-triazine.

4. A method of inhibiting the growth of plants which comprises bringing into contact with at least a part of a plant in an amount sufficient to inhibit plant growth, 2-trifluoromethyl-4,6-bis-ethylamino-s-triazine.

5. A method of inhibiting the growth of plants which comprises bringing into contact with at least a part of a plant in an amount sufficient to inhibit plant growth, 2-trifluoromethyl - 4-ethylamino-6-isopropylamino-s-triazine.

6. A method according to claim 1, wherein, in the triazine derivative, $n$ is 2.

7. A method according to claim 1, wherein, in the triazine derivative, $n$ is 3.

8. A method of inhibiting the growth of plants which comprises bringing into contact with at least a part of a plant in an amount sufficient to inhibit plant growth, 2-dichloromethyl-4-ethylamino-6-isopropylamino-s-triazine.

9. A herbicidal composition comprising a triazine derivative of the formula

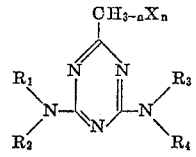

wherein:
X represents a halogen atom,
$n$ represents a number from 2 to 3,
$R_1$ and $R_3$ each represents a member selected from the group consisting of hydrogen, lower alkyl, lower alkenyl and lower alkoxyalkyl radicals, and
$R_2$ and $R_4$ each represents a member selected from the group consisting of hydrogen, lower alkyl, lower alkenyl and lower alkanoyl radicals,
in a concentration sufficient to inhibit plant growth and, as agricultural adjuvant carrier therefor, an inert solid carrier.

10. A herbicidal composition comprising a triazine derivative of the formula

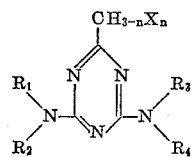

wherein:
X represents a halogen atom, $n$ represents a number from 2 to 3, $R_1$ and $R_3$ each represents a member selected from the group consisting of hydrogen, lower alkyl, lower alkenyl and lower alkoxyalkyl radicals, and $R_2$ and $R_4$ each represents a member selected from the group consisting of hydrogen, lower alkyl, lower alkenyl and lower alkanoyl radicals, in a concentration sufficient to inhibit plant growth and, as agricultural adjuvant carrier therefor, a surface active agent.

11. A herbicidal composition comprising a triazine derivative of the formula

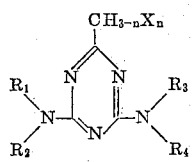

wherein:
X represents a halogen atom,
$n$ represents a number from 2 to 3,
$R_1$ and $R_3$ each represents a member selected from the group consisting of hydrogen, lower alkyl, lower alkenyl and lower alkoxyalkyl radicals, and $R_2$ and $R_4$ each represents a member selected from the group consisting of hydrogen, lower alkyl, lower alkenyl and lower alkanoyl radicals, in a concentration sufficient to inhibit plant growth and, as agricultural adjuvant carrier therefor, a high boiling organic liquid selected from the group consisting of mineral oil fractions, coal tar oils, vegetable oils and animal oils.

References Cited in the file of this patent
UNITED STATES PATENTS 2,867,621    Grundmann et al. _____ Jan. 6, 1959

FOREIGN PATENTS 1,135,848    France _____ Dec. 26, 1956

OTHER REFERENCES

Chemical Abstracts, vol. 44, 5806 (1950).
Weddige: Journal für praktische Chemie, vol. 141 NF 33, pages 76 to 90 (1886).
J.A.C.S., vol. 79, pages 941 to 949, Feb. 20, 1957.
Schaefer et al.: J.A.C.S., vol. 81, pages 1466–1474 (August 1948).